United States Patent [19]

Koht et al.

[11] Patent Number: 5,002,356
[45] Date of Patent: Mar. 26, 1991

[54] OPTICAL FIBER TAP HANDLING TRAY WITH FIBER INSTALLATION TOOL

[75] Inventors: Lowell I. Koht, Foster City; Donald Del Fava, San Carlos; Brian H. Clark, Sunnyvale; Dana M. Takaki, San Jose; George W. Haddock, Menlo Park, all of Calif.

[73] Assignee: Raynet Corp., Menlo Park, Calif.

[21] Appl. No.: 344,778

[22] Filed: Apr. 28, 1989

[51] Int. Cl.$^5$ .............................................. G02B 6/36
[52] U.S. Cl. ............................ 350/96.20; 350/96.21
[58] Field of Search ............... 350/96.15, 96.16, 96.20, 350/96.21, 96.22; 81/484, 486; 248/56, 309.1

[56] References Cited

U.S. PATENT DOCUMENTS

| | | | |
|---|---|---|---|
| 3,982,123 | 9/1976 | Goell et al. | 250/227 |
| 4,088,390 | 5/1978 | McCartney | 350/96.21 |
| 4,116,531 | 9/1978 | Greenwood | 350/96.20 |
| 4,160,580 | 7/1979 | Le Noane et al. | 350/96.21 |
| 4,192,056 | 3/1980 | Logan et al. | 350/96.21 |
| 4,270,839 | 6/1981 | Cross | 350/96.15 |
| 4,478,486 | 10/1984 | Fentress et al. | 350/96.20 |
| 4,498,732 | 2/1985 | Campbell et al. | 350/96.20 |
| 4,537,466 | 8/1985 | Moisson et al. | 350/96.20 |
| 4,556,282 | 12/1985 | Delebecque | 350/96.21 |
| 4,557,550 | 12/1985 | Beals et al. | 350/96.15 |
| 4,586,783 | 5/1986 | Campbell et al. | 350/96.15 |
| 4,623,156 | 11/1986 | Moisson et al. | 279/106 |
| 4,664,732 | 5/1987 | Campbell et al. | 156/158 |
| 4,728,169 | 3/1988 | Campbell et al. | 350/96.15 |
| 4,691,987 | 9/1987 | Ebner et al. | 350/96.23 |

FOREIGN PATENT DOCUMENTS 0159857 10/1985 European Pat. Off. .
0257999 2/1988 European Pat. Off. .

OTHER PUBLICATIONS

Evans et al., "Optical Fiber Alignment Tool", *IBM Technical Disclosure Bulletin*, vol. 22, No. 2 (Jul. 1979), pp. 686–687.
IBM Tech. Disc. Bull., Cefarelli et al., 21(4), Sep. 1978, "Optical Circuit Module Connector", pp. 1568–1570.

*Primary Examiner*—Frank Gonzalez
*Attorney, Agent, or Firm*—Dennis E. Kovach; Herbert G. Burkard

[57] ABSTRACT

An optical fiber waveguide tap handling tray is provided for use with a cable containing a plurality of optical fiber waveguides which are separated from the cable and exposed in a section thereof. The tap handling tray comprises a frame, a clamp for clamping the cable to the frame adjacent the section thereof so that the exposed optical fiber waveguides are thereupon physically secured to and contained within the frame, at least one optical tap secured to the frame for engaging and bending at least one of the plurality of optical fiber waveguides against an optical coupling medium having an index of refraction selected to match the index of refraction of the optical fiber so that light energy may pass through a side of the optical fiber and through the optical coupling medium, and wherein the optical tap defines an obtuse guiding angle arranged to lie in a path with which the fiber may freely be aligned within the frame after the cable has been clamped thereto. Taps having differing obtuse guiding angles may be selectively installed by the craftsman within the tray in order to select a desired amount of light energy interchange at the tap field location.

18 Claims, 12 Drawing Sheets

FIG_1

FIG_2

FIG_4

FIG_5

FIG_6

FIG_7

FIG_8

FIG_9

FIG_10

FIG_12

FIG_13

FIG_14

FIG_15a

FIG_15b

FIG_15c

FIG_15d

FIG_4b

OPTICAL FIBER TAP HANDLING TRAY WITH FIBER INSTALLATION TOOL

FIELD OF THE INVENTION

The present invention relates to apparatus and methods for installing taps onto optical communication fibers. More particularly, the present invention relates to tapping and handling apparatus, and methods for tapping and handling optical fiber waveguides.

BACKGROUND OF THE INVENTION

Optical fiber waveguides are rapidly proliferating throughout the entirety of terrestrial based voice and data communications systems. Individual optical fibers are typically long cylindrical structures, usually having a circular cross section. In its simplest form, an optical fiber typically has two coaxial regions, a central light-guiding core and a surrounding cladding. Both are typically formed of glass fiber, although the cladding may be of other suitable material, such as plastic having a lower index of refraction than the glass core. The core may range from five to 100 microns in diameter, while the outside cladding diameter may range from 8 to 140 microns. A sheath or buffer of a different material typically surrounds the waveguide to provide optical isolation with adjacent fibers and to provide mechanical protection for the delicate, extremely small fiber waveguide. Optical fiber waveguides are typically collected together in a cable having an impervious, reinforced outer skin.

While optical fiber waveguides have been conventionally collected into cables, a need has remained for effective apparatus and methods for handling the fiber waveguides at terminal ends, such as at long distance network, outside plant or service subscriber interfaces.

It is well known that individual optical fibers are extremely small, fragile and difficult to handle, particularly in connection with splicing and in the installation of optical taps. Specialized tooling and techniques have been proposed in the prior art for handling and aligning the delicate, minute fiber waveguides for such purposes as splicing and attachment of connectors.

U.S. Pat. Nos. 4,537,466 and 4,623,156, the disclosures of which are incorporated herein by reference, describe optical fiber chucks for precise fiber positioning. U.S. Pat. No. 4,728.169, the disclosure of which is hereby incorporated by reference, describes a passive tap and fiber positioning. U.S. Pat. Nos. 4,498,732 and 4,478,486 discuss fiber organization and storage methods to prevent bending. U.S. Pat. No. 4,160,580 describes a device for terminating the end of an optical fiber with a connector. An article by Evans et al. entitled "Optical Fiber Alignment Tool" appearing in *IBM Technical Disclosure Bulletin* Vol. 22, No. 2, July 1979, pages 686-687 describes a precise Vee groove formed in the bed of a tool for aligning and holding the ends of optical fiber waveguides together for laboratory activities. Vees of soft elastomer deformably press against sections adjacent to the ends, and thereby urge the fibers into desired axial registration and alignment.

While these specialized devices have been disclosed, one unsolved problem has been to provide an effective fiber handling device and method for field use by ordinarily skilled craftsmen and installers which is repeatable, which efficiently couples a light/electricity translation element to the optical fiber waveguide, and which protects and minimizes the potential for physical damage to the optical fiber.

It has been discovered that if an optical fiber waveguide is subjected to bending, it is possible to inject light energy into the fiber waveguide or withdraw light energy from the fiber waveguide at the situs of the bend. Bends formed in optical fiber waveguides for the intended purposes of light injection or withdrawal are known as optical couplers or "taps"; and, when a coupling body having a matched index of refraction is disposed adjacent to the fiber and to a photodetector or light source, light withdrawal or injection may respectively be usefully carried out without need for invasion of the cladding material. Examples of optical fiber taps are to be found in U.S. Pat. Nos. 4,664,732; 4,586,783; 4,557,550 and 4,270,839. A particularly preferred tap is described in U.S. patent application Ser. No. 07/213,642, filed on June 30, 1988, which is assigned to the assignee of the present invention. The disclosures of U.S. Pat. Nos. 4,664,732; 4,586,783 and U.S. patent application Ser. No. 07/213,642, are incorporated herein by reference.

SUMMARY OF THE INVENTION WITH OBJECTS

A general object of the present invention is to provide an optical fiber waveguide tap handling tray for arrangement, tapping and handling of optical fiber waveguides in a manner and arrangements which overcome limitations and drawbacks of the prior art approaches.

A specific object of the present invention is to provide an optical fiber waveguide tap handling tray which efficiently couples light energy between the optical fiber and light/electricity translation element, either light emitter or photodetector, and which simultaneously provides positive mechanical connection and protection to the delicate, minute optical fiber waveguides.

Another specific object of the present invention is to provide an optical fiber waveguide tap handling tray which may be a unitary module adapted for plug-in attachment to an interface module containing additional functional modules.

A further specific object of the present invention is to provide an optical fiber waveguide tap handling tray which may include both narrowband and broadband taps, and in which broadband taps are comprised of assemblies including optical fiber pigtails for conducting light to a remotely located, noise and interference isolated light energy translation element. (As used herein, the term "narrowband" means data transfer speeds up to about 50 to 60 megabits per second; and, "broadband" means data transfer speeds greater than about 50 or 60 megabits per second).

One more specific object of the present invention is to provide an optical fiber waveguide tap handling tray in which taps may be installed and removed as subassemblies by the craftsman in the field so that a tap having a particularly suitable bend radius profile to provide optimized light injection or withdrawal may be selected and installed at a particular location in an optical fiber communications system.

A further object of the invention is to provide a loading mechanism which is capable of loading an intermediate section of an optical fiber into a predetermined plane of an optical tap in a gentle manner while imposing minimum stress on the optical fiber intermediate section.

In accordance with the principles of the present invention, an optical fiber waveguide tap handling tray is provided for use with a cable containing a plurality of optical fiber waveguides which are separated from the cable and exposed in a section thereof. The tap handling tray comprises a frame, a clamp for clamping the cable to the frame adjacent a section thereof so that the exposed optical fiber waveguides are thereupon physically secured to and contained within the frame, at least one optical tap secured to the frame for engaging and bending at least one of the plurality of optical fiber waveguides against an optical coupling medium having an index of refraction selected to match the index of refraction of the optical fiber so that light energy may pass through a side of the optical fiber and through the optical coupling medium, and wherein the optical tap defines an obtuse guiding angle arranged to lie in a path with which the fiber may freely be aligned within the frame after the cable has been clamped thereto.

These and other objects, advantages, aspects and features of the present invention will be more fully understood and appreciated by reference to the following detailed description of preferred embodiments presented in conjunction with the accompanying drawings.

BRIEF DESCRIPTION OF THE DRAWINGS

In the Drawings:

FIG. 4a is an enlarged, somewhat diagrammatic view in section of an optical tap portion of the FIG. 3 tray, taken along section line 4—4 in FIG. 3. A blade portion of a fiber installation tool is also illustrated in FIG. 4a.

FIG. 4b illustrates a perspective view of the tool shown in FIG. 4a.

FIG. 6 is a more detailed view of the camming mechanism of the optical tap portion shown in FIG. 4a.

DETAILED DESCRIPTION OF THE PREFERRED EMBODIMENT

Figure 1:
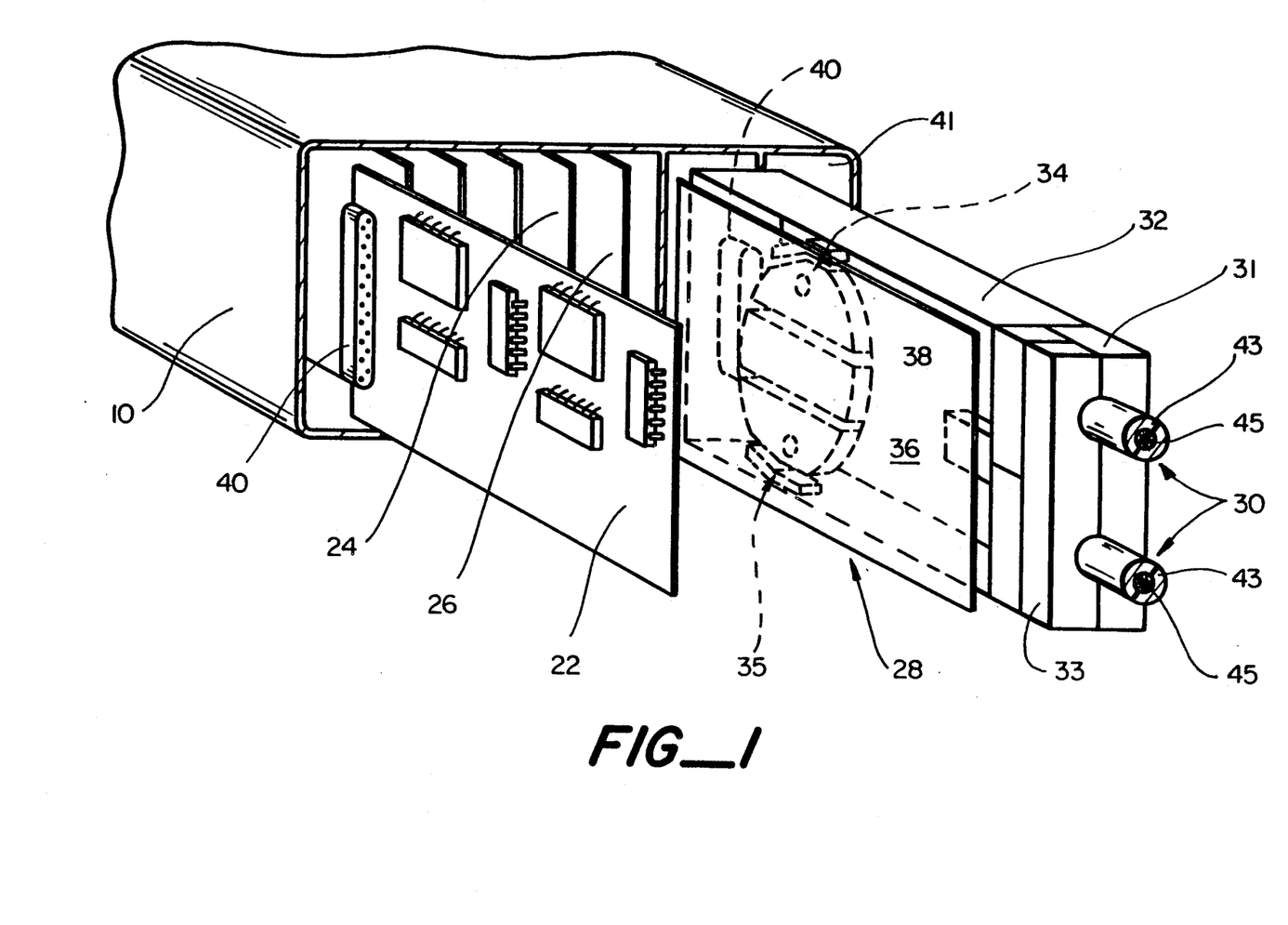
FIG. 1 is a front perspective view of an equipment enclosure containing one or more optical fiber tap handling trays in accordance with the principles of the present invention.
Figure 2:
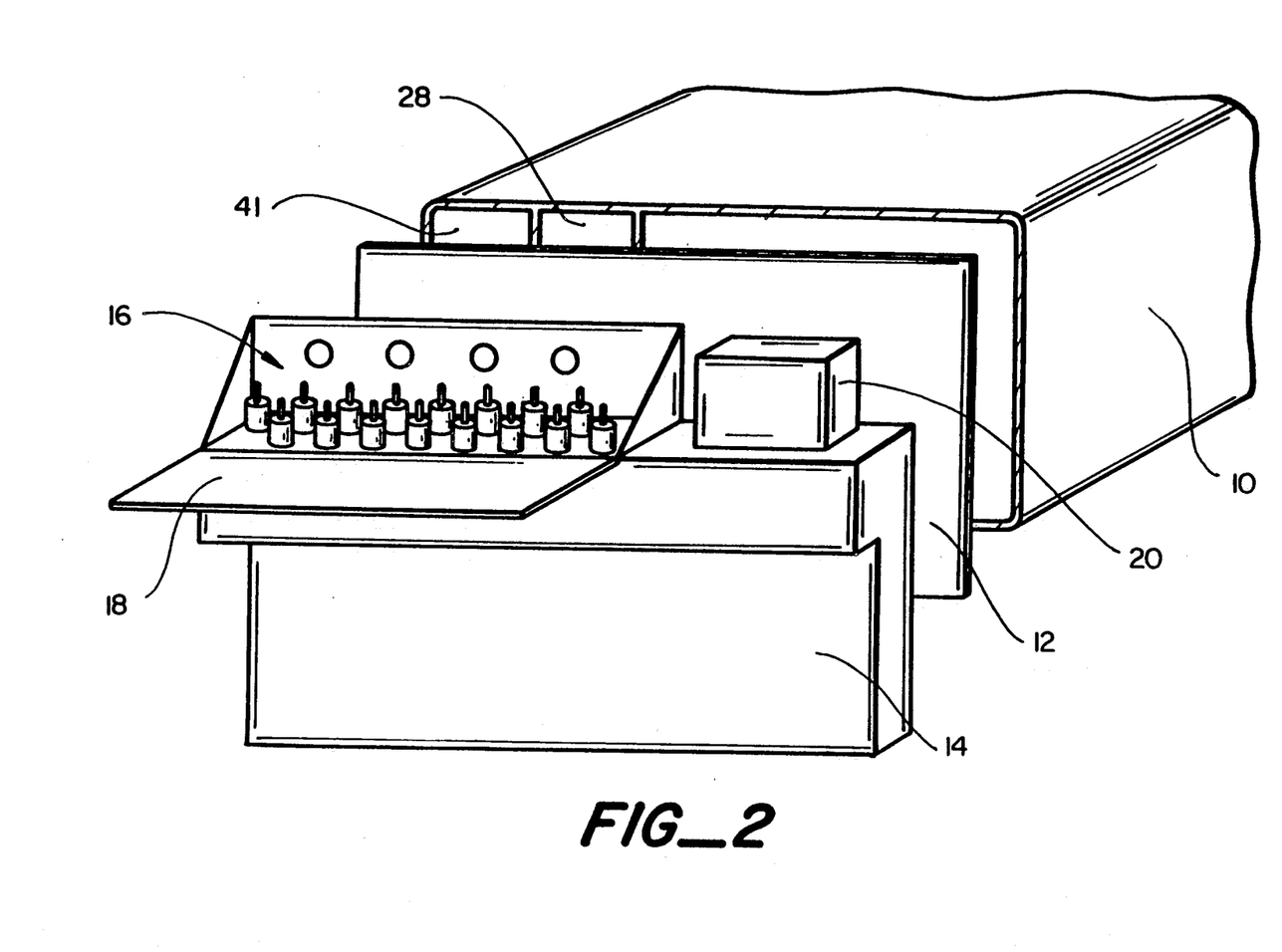
FIG. 2 is a back perspective view of the equipment enclosure depicted in FIG. 1.

With reference to FIGS. 1 and 2, a subscriber interface unit (SIU) 10 is depicted. The SIU is preferably formed of a suitable material such as a large rectangular tube of extruded aluminum alloy, and it may be provided with longitudinal fins to increase heat dissipation capacity by convection to the ambient environment. The SIU 10 is intended to be ruggedized, for installation in outside plant cable vaults as well as at service subscriber equipment rooms or premises. The function of the SIU 10 is to provide an electrical or optical interface between the optical fiber waveguides and subscriber lines, whether individual tip and ring telephone service pairs or broadband data/video channels.

Referring specifically to FIG. 2, the SIU 10 is provided with a backplane 12 which enables plug-in interconnection of interface functional modules to be described in greater detail hereinafter. A weathertight read cover 14 covers and seals the backplane end of the SIU 10 against the ambient environment. A terminal block 16 includes a series of wire terminals and is provided for electrical wire interconnection with the optical fiber network at the SIU 10. The terminals are connected via the backplane 12 to the functional modules. A cover 18 enclosed and seals the terminal block 16 against the environment to provide mechanical protection from disturbances within the cable vault/equipment room and some protection against the ambient environment.

A power supply/surge protection block 20 provides a source of entry of primary supply power, such as 110 volt ac line voltage, in order to supply the electrical/electronic circuitry of the functional modules within the SIU 10. The surge protection feature protects the circuitry from damage due to voltage surges, spikes or other unwanted transients present on the primary voltage supply line.

Returning to FIG. 1, it may be seen that the SIU 10 encloses a plurality of functional modules. These modules include several line cards 22 which perform digital to analog and analog to digital conversions for one or more telephone signals carried by a particular optical fiber waveguide or set thereof. In practice, each optical fiber waveguide may carry up to 200 or 300 separate subscriber voice grade service channels or paths, for example. A Test and Maintenance module 24 is provided to enable testing and maintenance procedures to be carried out. A digital central processing unit module 26 provides a central supervisor for supervising the functions carried out within the SIU 10.

Figure 3:
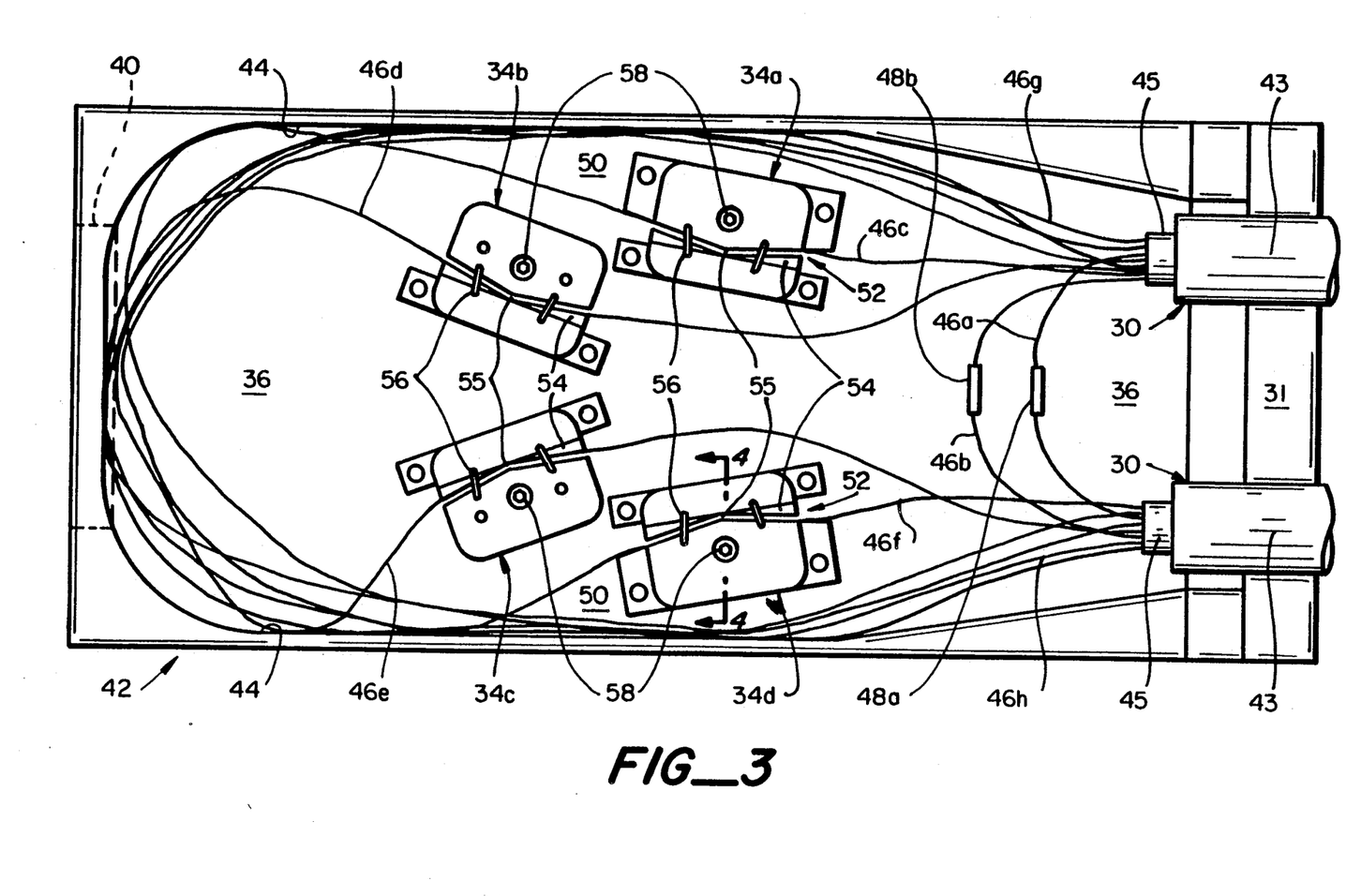
FIG. 3 is a somewhat diagrammatic side view in elevation of one embodiment of an optical fiber tap handling tray in accordance with the principles of the present invention.

FIG. 1 also illustrates an optical fiber handling tray 28 as another one of the plug-in functional modules present within the SIU 10. As with the other functional modules 22, 24 and 26, the tray 28 includes a metal frame 32 which is adapted to slide into the SIU and to plug into a backplane receptacle via a suitable backplane connector 40 as shown in FIG. 3. Longitudinal protrusions or grooves may be formed (by extrusion for example) in the SIU frame 10, and these protrusions or grooves may be used as guides by suitable longitudinal structure on the top and bottom walls of the frame 32, so that the optical fiber handling tray 28 is properly aligned as it slides into the SIU 10.

An optical fiber containing cable 30 enters and leaves the tray 28 via suitable openings provided through a block 31 and clamp 33 located at a front end of the tray, opposite from the backplane end thereof. The removable clamp 33 enables the cable 30 to be looped through and secured to the tray 28 in a sealing relation therewith at the locations of entry and exit. As perhaps best seen in the FIG. 3 embodiment, the cable 30 includes an outer cover 43 of suitable material such as flexible plastic or rubber elastomer, an interior protection sheath 45, and a plurality of optical fiber waveguides 46. The outer cover 43 and interior protective sheath 45 are stripped away in order to expose a section of the fibers 46 within the tray between the entry and exit of the cable 30. Eight such waveguides 46 are shown in FIG. 3 within the cable 30, though in practice the cable could contain fewer fibers, or it could contain as many as several hundred fibers. It has been found advantageous to provide a hermetic seal between the cable 30 and tray 28 in order to minimize intrusion of moisture into the interior of the tray 28. Suitable sealing means and techniques, such as those described in published European Patent Application, No 0,257,999, hereby incorporated by reference, or equivalents may be employed to minimize entry of moisture into the interior spaces of the tray 28. A suitable desiccant may also be included within the tray to control humidity.

The tray 28 may be provided with a plurality of waveguide couplers or taps. A voice circuit coupler or tap 34, of the type illustrated in FIGS. 3–7, may be provided, and this tap 34 includes a light/electricity translation element 62 (either light source or photodetector) directly mounted thereon which optoelectronically interfaces an intermediate segment of the optical fiber waveguide with electronic circuitry carried on a circuit board 37 (FIG. 6) mounted to the tray 28 on the backside thereof. The circuitry on the circuit board 38 handles the signals of the light/electricity translation element 62 and interfaces the electrical representation thereof via the connection 44 to the backplane. Thus, the structure of each tap 34 may be secured to the circuit board 37 and the composite tap 34/circuit board 37 may be installed (and removed or replaced) relative to the tray 28 during service procedures as a single unit. Alternatively, because the circuit board 37 is separately attachable to the tray 28, the tap 34 can be separately removed from or installed in the tray 28 without interfering with the circuit board 37. This feature is important in order to enable the craftsman to select and install a tap 34 which has a bend radius profile that provides a predetermined amount of light energy injection or withdrawal relative to the optical fiber. Thus, the level of light required at the situs of the tray 28 for effective operations may be field selected by installation of an appropriately profiled tap 34.

Figure 11:
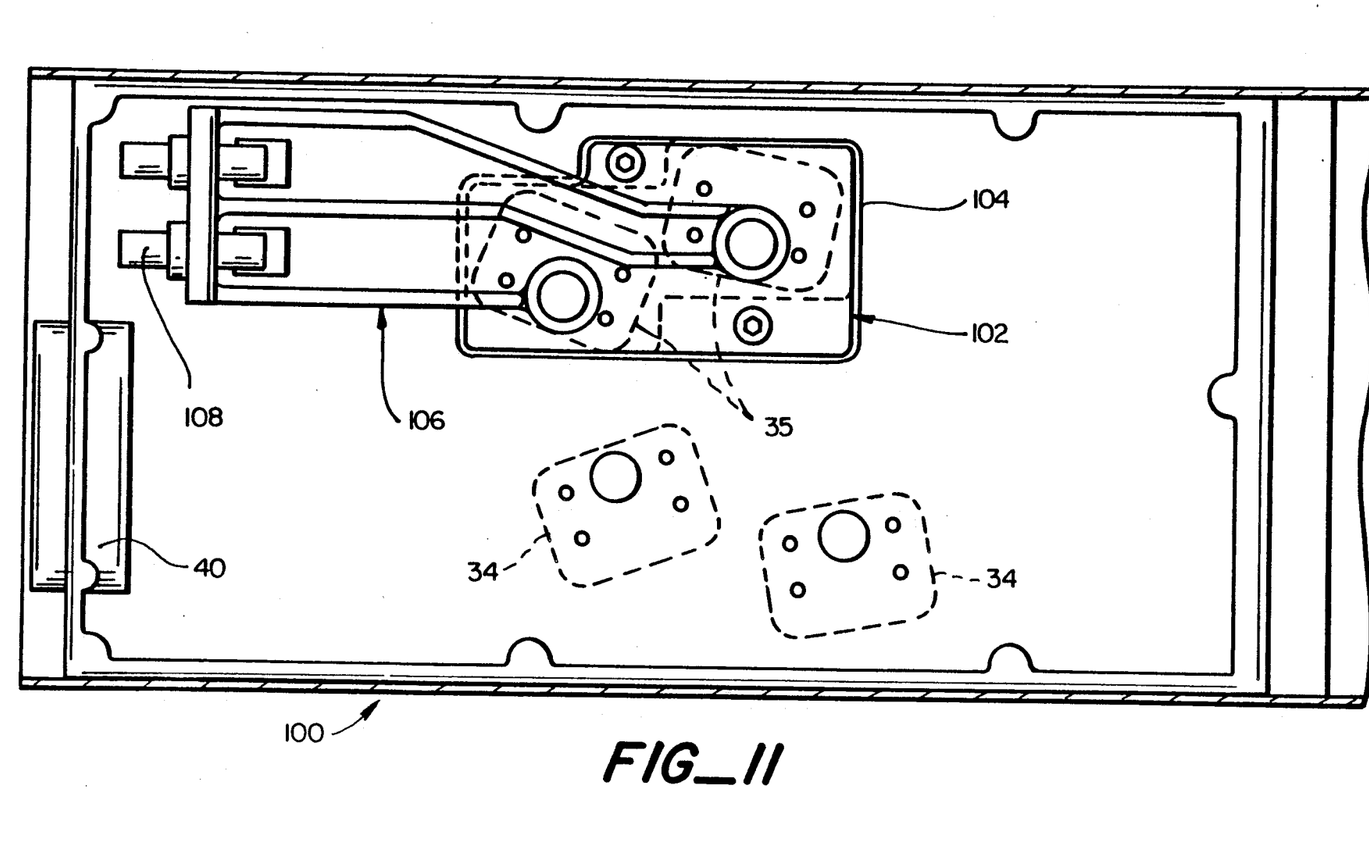
FIG. 11 is a diagrammatic view in side elevation of an embodiment similar to the FIG. 8 embodiment but showing greater structural detail of the removable broadband coupler assembly.
Figure 12:
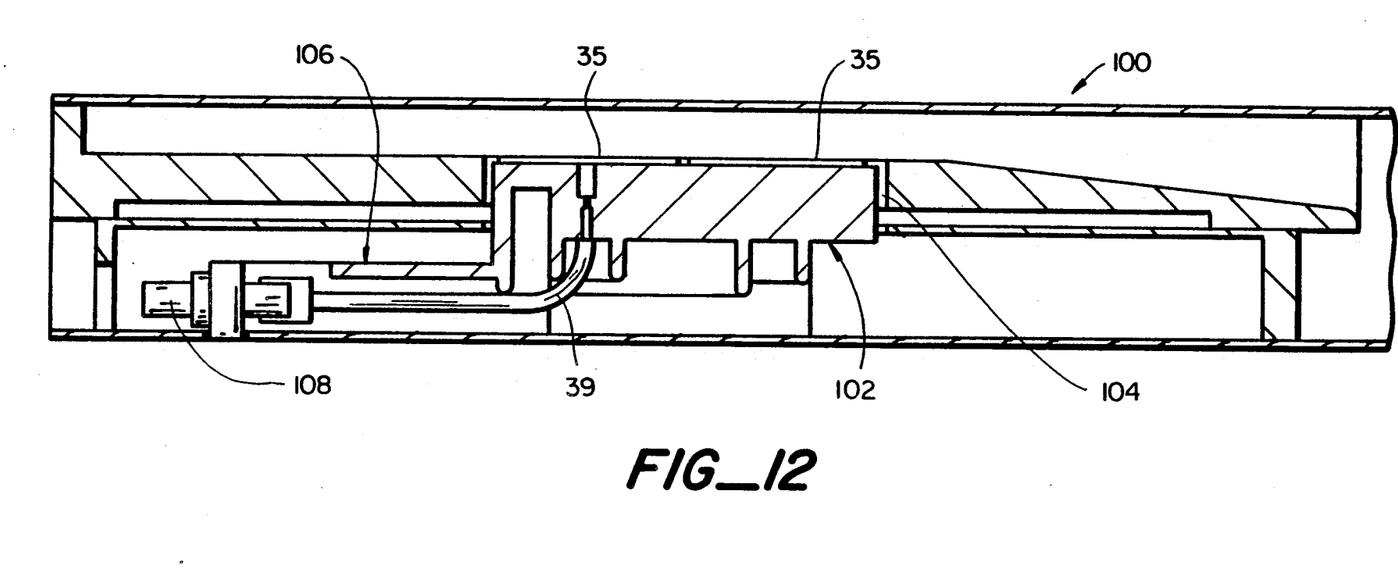
FIG. 12 is a top plan view in section of the FIG. 11 embodiment.

Referring to FIGS. 1, 9, 11 and 12, a broadband coupler 35 enables broadband signals to be obtained from or injected into a particular optical fiber waveguide. Such signals may comprise broadband high speed digital data channels or video channels (e.g. 500 megabits per second). A difference structurally between the broadband coupler or tap 35 and the narrowband voice circuits tap 34 is that the light/electricity translation element 12 is not mounted adjacent to the tap structure 35. Rather, an optical pigtail element 106, as seen in FIGS. 11 and 12, conducts the extracted/injected light between the backplane 12 and the tap structure 35. A separate broadband plug-in module 41 interfaces a broadband light/electricity translation element with the broadband pigtail 106 via suitable optical plumbing and connectors at the backplane 12.

Referring to FIG. 1, the tray 28 preferably defines at least one region 36 in which optical splices may be located. This region 36 can be in a vicinity of a cable end of the frame or a backplane end of the frame. While it is not necessary that the cable 30 be terminated at the tray 28, if it is a cable termination location, then the optical fiber waveguides must all be spliced together in order to conduct the light energy in a series network arrangement. The splices are thicker than each fiber, and the space 36 provides a suitable location to arrange the splices and protect them from disturbance within the cable vault/equipment room operating environment. Channels 38 may be provided within the try 28 in order to arrange and organize the optical fibers which are not being tapped at either of the taps 34 or 35.

A slightly modified tray 42 incorporating principles of the present invention is depicted in FIG. 3. In the FIG. 3 preferred embodiment, four narrowband voice grade optical taps 34a, 34b, 34c and 34d are provided in lieu of any wideband taps 35. An alternative preferred embodiment is to provide two narrowband taps on one side of the tray and two broadband taps on an opposite side of the tray. The cable 30 is shown with e.g. eight optical fiber waveguides 46a, 46b, 46c, 46d, 46e, 46f, 46g, and 46h. Fibers 46a and 46b are shown with splices 48a and 48b arranged in the space 36. Fibers 46c, 46d, 46e and 46f are respectively installed in the taps 34a, 34b, 34c and 34d in FIG. 3. An additional space 36 provides room for splices and fiber waveguides to be organized and arranged behind the taps 34 adjacent the backplane connector 40 end of the tray 42. Inside surfaces 44 of sidewalls of the tray 42 cooperate with the raised outer geometry of the taps 34a and 34d to provide a convenient peripheral guideway 50 for the segments of optical fibers not secured to any of the adjacent taps 34. The peripheral guideway 50 functions, as do the channels 38, to guide, locate, organize and protect the otherwise loose fibers 46 which may not be physically secured to the tray by adjacent taps 34.

Figure 4:
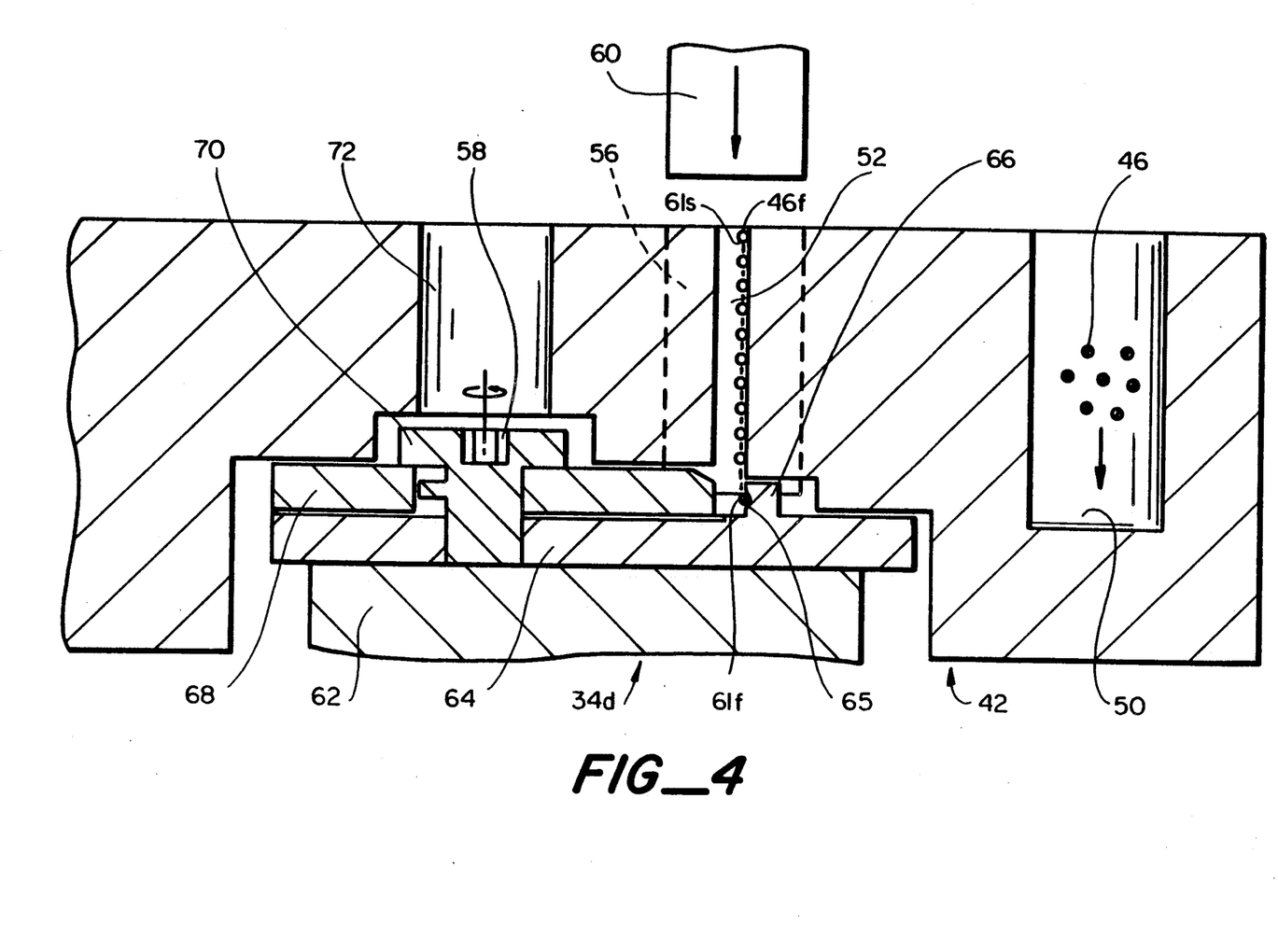
Figure 4B:
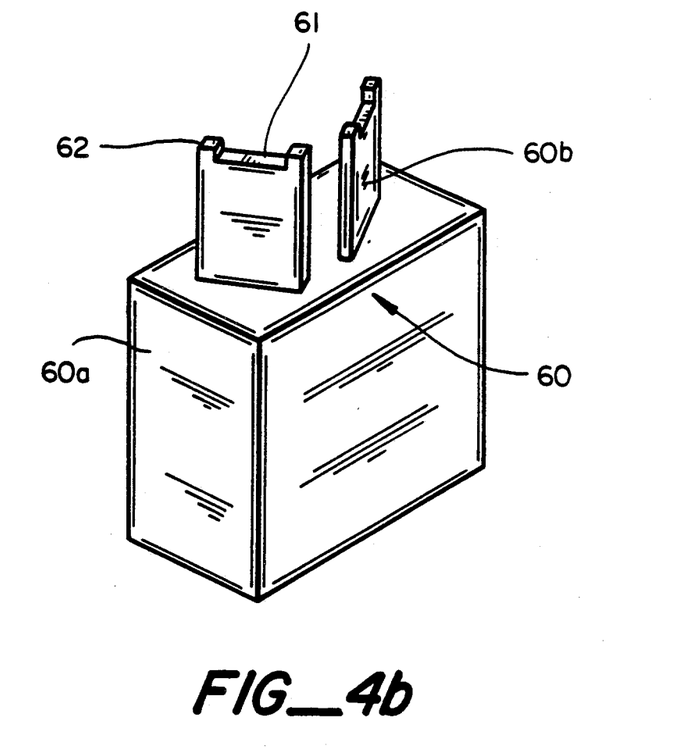

Means are also provided for easily and conveniently loading an intermediate segment of the optical fiber into each tap 34 so as to induce minimum stress on the fiber. Each tap 34 is preferably mounted to a bottom of substrate 152a, 152b, 152c, 152d, the substrate including a slotted, obtuse angled narrow opening or slit 52 for receiving the intermediate segment of an exposed section of optical fiber 46. One face 54 of each slit 52 oppositely facing the guideway 50 is slanted relative to the horizontal, except at a centralmost apex portion 55 of the tap 34, to facilitate guiding of the fiber waveguide 46 into the tap 34. Transverse horizontal slots 56 extend through each substrate 152a, 152b, 152c, 152d at locations straddling the slit 52. These slots 56 are provided to receive a double tined or pronged insertion tool 60 having a base 60a and first and second tines 60b, (FIGS. 4a, 4b), the tines pressing against the fiber 46f, for example, and guiding it into tap position along a locus of movement 61 from a start position 61s to a final tap position 61f in which the optical fiber 46f is nested in a groove 65 formed in a raised and angled guiding member 66 of the coupler body 64 of the tap 34d as shown in FIG. 4a. Preferably, the tines 60b and slots 56 interengage like gear teeth to guide the fiber. The tines 60b have a surface 62 which contacts an upper surface of the tap coupler body 64 (FIG. 5) when the tines 60b are interengaged with the slots 56. The surface 62 has a recess 61 formed therein which has a depth approximately equal to an outside diameter of the optical fiber 46f. Preferably the depth of the recess is less than 3 diameters of the fiber, more preferably less than 2 diameters, optimally about 1 diameter. The fiber 46f is inserted into a predetermined plane of the tap 34 by locating an intermediate section of the optical fiber in the recesses 61 of the tool 60 in a vicinity of the substrate slit 52 and subsequently interengaging or interconnection the piece or member or tool or tine 60b with the slot 56 until the surface 62 of the tine 60b contacts an upper surface of tap coupler body 64 so as to confine parts of the intermediate section of the optical fiber in a gap formed by the surface 62 of the tool tine 60b, the recess 61 of the tool tine 60, and an upper surface of the coupler body 64. This allows the fiber to be easily loaded in the tap by then engaging closure member 68 against guiding member 66 having the groove 65 therein. Such a loading procedure imposes minimum stress on the optical fiber. The tool tine 60b may be separately provided as shown in FIG. 4b, or may be integrally formed as part of a lid for each tray.

Figure 7:
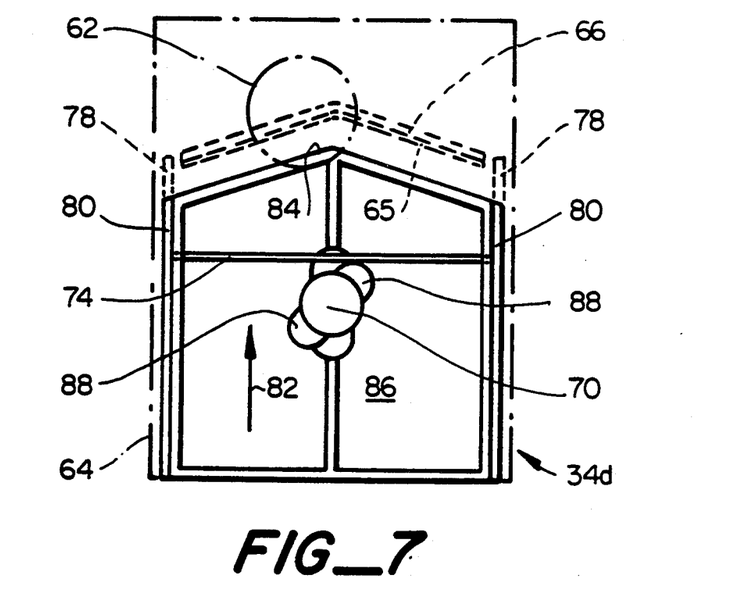
FIG. 7 is a bottom plan view of the optical tap mechanism shown in FIG. 4a, with the rest of the FIG. 4a camming mechanism structure shown in phantom by broken lines.

A central opening through each tap 34 leads to a rotatable, spring biased camming mechanism 58 adapted to receive a standard tool, such as a hex wrench or screwdriver through a transverse outer opening 72. After the optical fiber 46 is nested in its final tap position 61f by use of the tool 60, a cam screw 70 of the camming mechanism 58 is rotated, and closure member 68 is moved to bias the intermediate segment of the optical fiber waveguide 46f against the grooved guiding surface 65 of the coupler guiding member 66. A leaf spring 74 shown in FIG. 7 provides a resilient bias force for returning the closure member 68 to its open position from the angled guiding surface 66 upon again rotating the camming mechanism 58.

Figure 5:
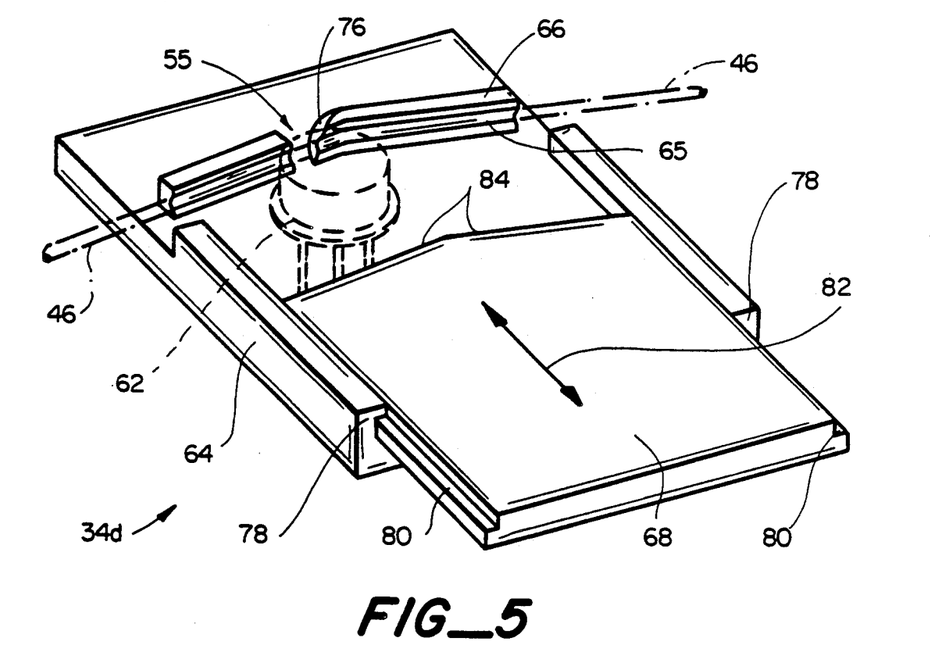
FIG. 5 is a somewhat diagrammatic view in perspective of an optical tap geometry suitable for use with the FIG. 3 tray. The optical fiber is shown in broken line outline in this Figure.
Figure 6:
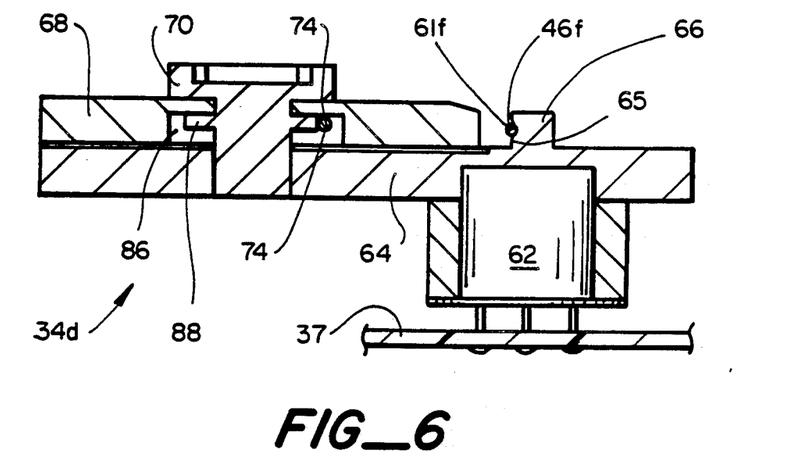

Referring to FIG. 5, a reflector surface 76 formed at the angle apex 55 of the guiding member 66 directs light energy to and from the tapped optical fiber 46 and a receiver/transmitter element 62 disposed transverse to the optical fiber directly below the apex 55 and reflector surface 76. This particular tap arrangement is disclosed in the assignee's copending U.S. patent application Ser. No. 07/213,642, which has been incorporated by reference herein.

The coupler body 64 may be formed with sidewalls having grooves 78 which cooperate and guide tongues 80 of the member 68 along a locus of movement 82 of the closure member 68 relative to the coupler body 64. An inner end surface 84 of the closure member 68 is congruent with the guide groove 65, so that when the closure 68 is cammed against the optical fiber 46f, for example, the optical fiber is precisely aligned and nested in the groove 65. A hollow space 86 within the closure member 68 provides room for the leaf spring 84 and cam protrusions 88 of the cam screw 70.

Figure 8:
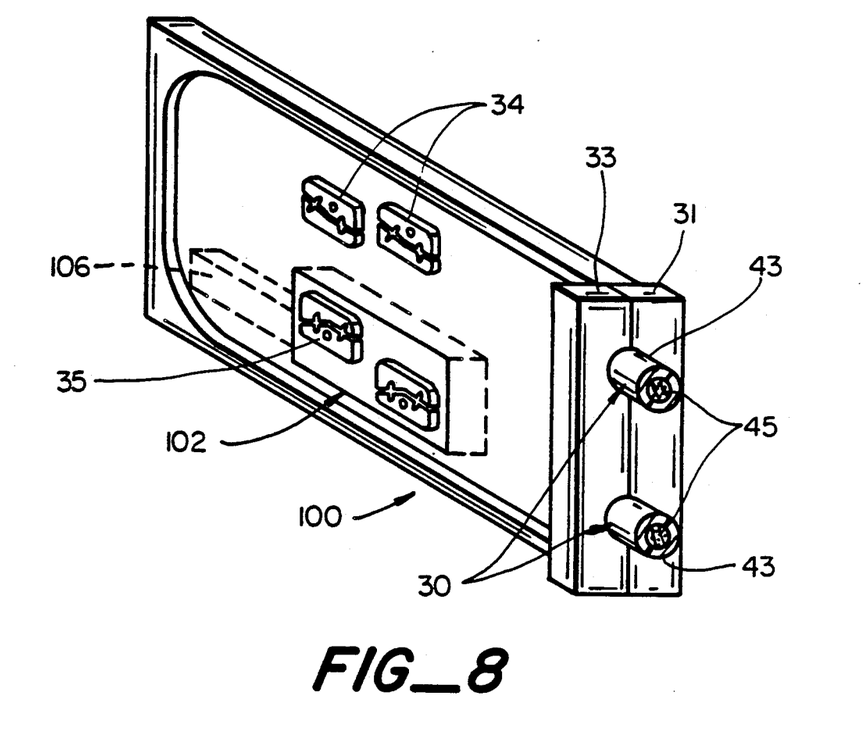
FIG. 8 is a diagrammatic view in perspective of an alternative embodiment of an optical fiber tap handling tray in accordance with the principles of the present invention showing a broadband optical coupler assembly installed in the tray through an opening from the backside thereof.
Figure 9:
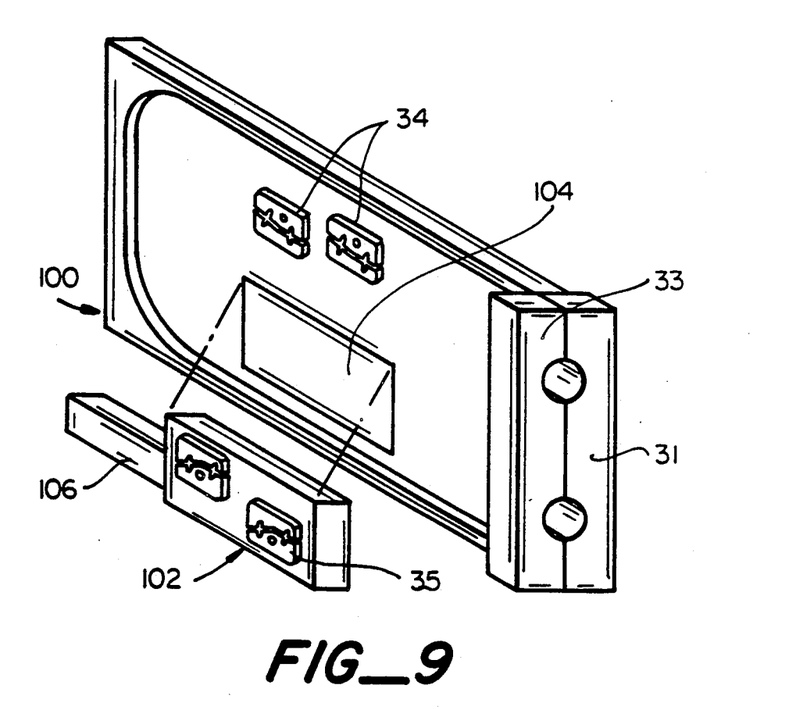
FIG. 9 is a diagrammatic view in perspective of the FIG. 8 embodiment, showing the removable broadband optical coupler assembly removed from the tray and separately illustrated.

FIGS. 8-12 illustrate a tray 100 which is a variant of the tray 28 of FIG. 1 and the tray 42 of FIG. 3, which accommodates both narrowband taps 34 and broadband taps 35. (Common reference numerals refer to structural elements previously discussed herein.) As previously explained, the broadband taps 35 employ optical pigtails 39 which communicate light energy between the tapped optical fiber waveguide 46 and the broadband signal module 41. (See FIG. 12). In order to provide the broadband taps 35 as a single unit, a broadband subassembly 102 is provided which may be mounted to the tray 100 through the back thereof via a suitable opening 104 as shown in FIG. 8 and 9. A pigtail shroud portion 106 of the subassembly 102 encloses and protects the optical pigtails 39 leading from the broadband couplers 35. Suitable optical connectors 108 (FIG. 12) are included within the end of the shroud portion 106 for enabling optical connection of the pigtails 39 and the backplane 12. Alternatively, the pigtails 39 are taken through the backplane 12, extended along the back side of the backplane, and brought back through the backplane to connect with a suitable broadband processing module within the SIU 10.

Figure 10:
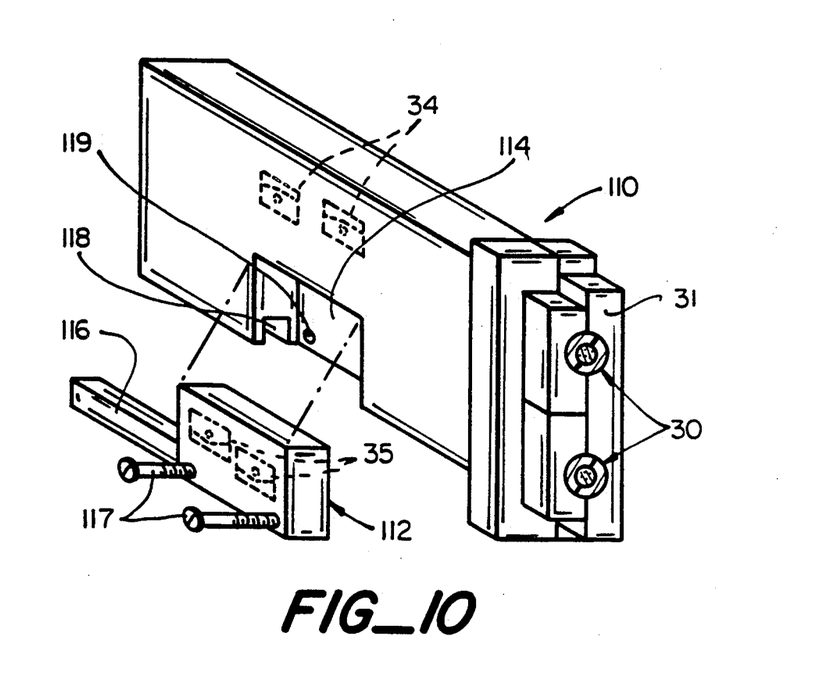
FIG. 10 is a diagrammatic view in perspective of another embodiment of an optical fiber tap handling tray in accordance with the principles of the present invention showing a removable broadband optical coupler assembly which may be installed in the tray via a bottom edge opening.

Alternatively a tray 110 may be provided as illustrated in FIG. 10 which includes a broadband subassembly 112 adapted for insertion into the tray 110 via a lower peripheral region 114 formed in the tray 110. Bolts 117 and bolt holes 119 are provided for releasably attaching the tap to the tray. The arrangement has the advantage that the broadband subassembly 112 may be inserted and removed from the tray 110 without disturbing or otherwise moving the backside-mounted circuit board 37 serving the narrowband couplers 34. An optical pigtail shroud portion 116 of the subassembly 112 is adapted to fit inside of a channel 118 formed in the lower rear outside edge of the tray 110.

Figure 15A:
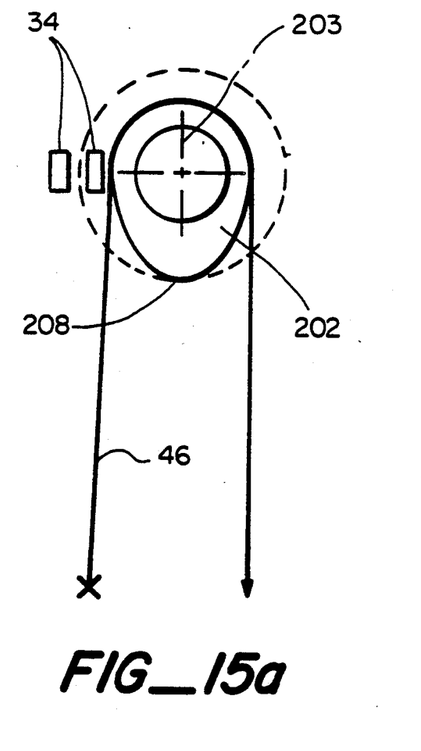
FIGS. 15a, 15b, 15c and 15d are diagrammatic views of various rotational positions of the FIG. 13 rotary loader illustrative of its operation in loading the fiber waveguide into the tap.
Figure 15B:
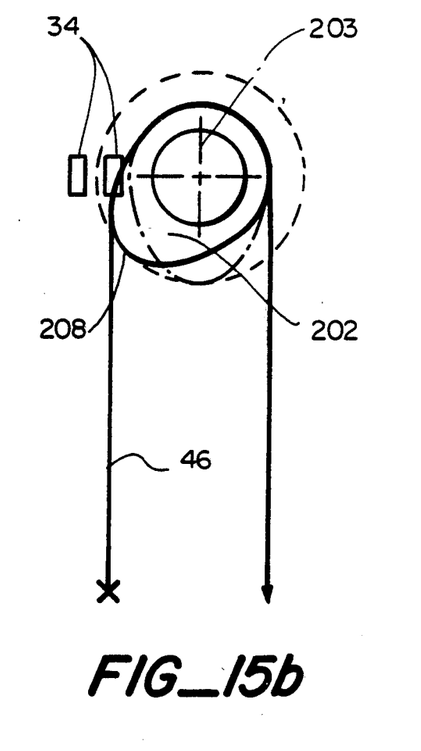
Figure 15C:
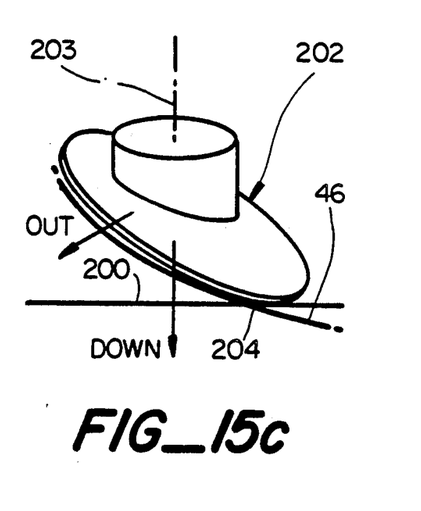
Figure 15D:
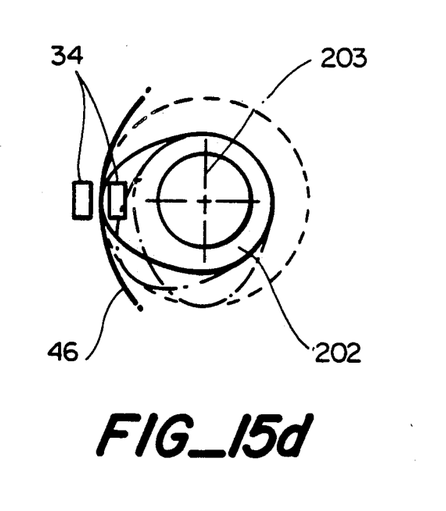

FIGS. 13, 14 and 15a-d illustrate a further embodiment of the present invention. An optical fiber handling tray 200 includes an eccentric wrapping mandrel 202 rotatable about an axis 203 and defining a fiber guide groove 204. As shown in FIG. 15a the optical fiber 46 is wrapped around the mandrel 202 in a loading position. When the mandrel has been rotated about 60 degrees clockwise from its original position, as shown in broken line in FIG. 15b, the optical fiber 46 is guided into the groove 204 and is directed toward the optical tap 34. The downwardly guiding structure of the mandrel 202 defining the groove 204 is shown illustratively in FIG. 15c. As the mandrel 202 is further rotated in a clockwise sense and the fiber 46 enters the guide groove 204, the fiber 46 is thereby directed downwardly toward the floor of the tray 200. As an eccentric tip 208 of the rotating mandrel 202 passes by the optical coupler 34, the fiber 46 is directed and forced into the groove 52 of the optical tap 34. Once the fiber 46 is thus installed in the tap 34, the camming screw 70 may then be rotated and the fiber 46 thereby secured in place. As is suggested in FIG. 13, the mandrel 202 may be rotated in a clockwise direction to load the tap 34a, and in a counterclockwise direction to load the tap 34b. One or more wipers 210 may be provided to clean the optical fiber before it is inserted into the tap. Also, the groove 204 may be provided with a coating or a liner which facilitates slidable movement of the optical fiber relative to the groove 204.

Figure 13:
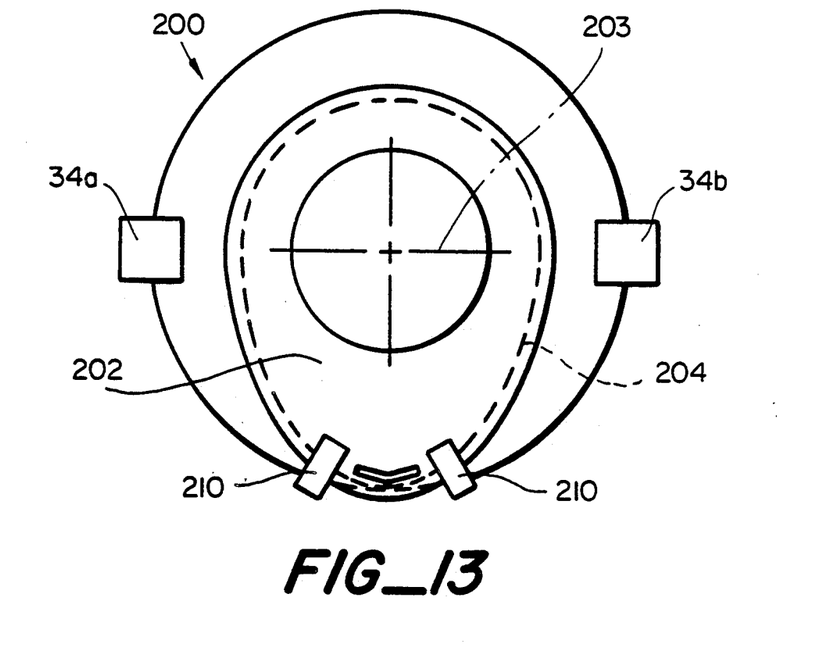
FIG. 13 is a top plan view of a frustoconical rotary fiber tap loader embodiment incorporating principles of the present invention.
Figure 14:
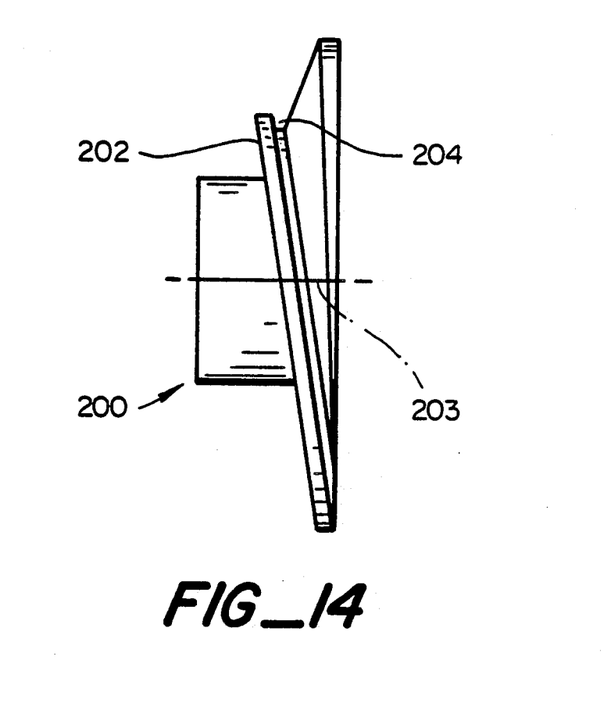
FIG. 14 is a die view in elevation of the loader depicted in FIG. 13.

There may be several taps, e.g. at 3 o'clock, 6 o'clock, 9 o'clock and 12 o'clock, for example, along the locus of movement of the eccentric tip 206, so that selected 90 degree rotations of the mandrel 202 may load each of the taps 34 so disposed.

Having thus described presently preferred embodiments of the present invention, it will now be appreciated by those skilled in the art that many changes in construction and widely differing embodiments and applications of the invention will suggest themselves without departure from the spirit and scope of the invention. The disclosures and the description herein are intended to be illustrative and are not in any sense limiting of the invention, more preferably defined in scope by the following claims.

We claim:

1. An apparatus for loading an intermediate segment of a section of an optical fiber into an optical fiber tap which couples light between the intermediate segment of the fiber and an optical element, comprising:

an optical fiber tap which includes means for bending the intermediate segment of the optical fiber within a plane such that light can be coupled between a core of the fiber and a light element; and a substrate disposed over the optical fiber tap bending means, the substrate defining an aligning and guiding groove which has a top area descending transversely relative to the plane of the optical fiber tap to a bottom area adjacent the tap bending means, the top area being larger than the bottom area such that the groove converges towards the bending means so as to allow the optical fiber section to be guided into the bending means plane.

2. The apparatus of claim 1 wherein the aligning and guiding groove has a first sidewall extending substantially perpendicular to the optical fiber containing plane and a second slanted sidewall which forms an acute angle with the plane.

3. The apparatus of claim 1, wherein the optical fiber tap bending means includes a second groove for holding and bending the fiber intermediate segment, the second groove having a linear length less than 3 cm.

4. The apparatus of claim 1, further comprising a tool for inserting the optical fiber into the aligning groove and the fiber bending means, the tool and substrate including interconnecting members which, when interconnected gently move the fiber through the aligning and guiding groove and into the plane.

5. The apparatus of claim 4, the substrate members comprising third and fourth grooves which intersect the aligning, groove on opposite sides of a portion of the fiber bending means which forms a bend in the fiber, the tool members including first and second tines sized so as to mate with the third and fourth grooves.

6. A tool for inserting an intermediate segment of an optical fiber into a tap which bends the intermediate segment so as to allow light coupling between a core of the fiber and a light element, comprising:

first and second tines;
   a bridging member interconnecting the first and second tines;
   the first and second tines being sized so as to be receivable into first and second tine grooves of a tap loader which each forms an angle with a fiber guiding groove of the tap loader for guiding the intermediate segment of the optical fiber into a tap bend guiding region plane.

7. A method of attaching an intermediate segment of an optical fiber to a tap which bends the intermediate segment of the fiber so as to allow either light injection into or light withdrawal from a core of the fiber, comprising the steps of:

disposing the optical fiber in a first groove having an enlarged opening at a top of the groove, the groove converging inwardly and having a bottom opening which confronts a fiber bend guiding region of the tap, the tap bend guiding region being capable of bending the intermediate segment of the optical fiber in a plane so as to allow either light injection into or light withdrawal from the fiber core; and urging a tool and the intermediate segment of the optical fiber together to press the fiber into the first groove and into the plane.

8. The method of claim 7 further comprising the steps of:

wrapping the optical fiber around a mandrel having a tip, the mandrel defining the first groove and the tool; and rotating the mandrel until the tip forces the fiber through the first groove and into the tap, the first groove defining a helix relative to the tap bend guide region.

9. The method of claim 7, wherein the opening of the first groove is a bottom opening and defines an apex of this groove and is contiguous with the tap end guiding region, an end of the tool being moved downwards and into a second groove formed in a substrate containing the first groove, the first and second grooves intersecting one another.

10. A fiber loading mechanism for loading an intermediate section of an optical fiber into a predetermined plane in an optical tap which bends the fiber intermediate section so as to allow light coupling between a core of the fiber and a light element, comprising:

first and second interconnecting members which, when interengaged, form a gap which lies in a vicinity of the predetermined plane, a part of the fiber intermediate section being disposed in the gap when the first and second members are interengaged.

11. The mechanism of claim 10, the first and second interconnecting members comprising a tray lid and substrate or a tool and a substrate.

12. The mechanism of claim 10, the first and second interconnecting members comprising a substrate having a groove therein which terminates at the predetermined plane and a piece having a shape complementary to that of the groove, a surface of the piece which confronts the predetermined plane when the piece is interconnected with the groove having a recess therein which, together with the predetermined plane forms the gap.

13. The mechanism of claim 12, the groove being traverse to a second groove formed in the substrate which guides an entire length of the intermediate section of the optical fiber into the predetermined plane.

14. The mechanism of claim 13, the gap being approximately as deep as an outside diameter of the fiber intermediate section, and further comprising third and fourth interconnecting members having a shape similar to that of the first and second interconnecting members.

15. A fiber loading mechanism for loading an intermediate section of an optical fiber into a predetermined plane in an optical tap which bends the fiber intermediate section so as to allow light coupling between a core of the fiber and a light element, comprising:

a substrate disposed over the tap, the substrate including a groove having a bottom opening confronting the optical tap plane through which the fiber intermediate section can be urged so as to be placed in the plane;

means interconnectable with the substrate such that when the fiber intermediate section is disposed in a vicinity of the groove and the interconnectable means is interconnected with a substrate the fiber intermediate section is urged into the predetermined plane.

16. The mechanism of claim 15, the interconnectable means comprising a member which is insertable into a second groove of a substrate and has a shape complementary to that of the second groove.

17. The mechanism of claim 16, the interconnectable means comprising first and second members which are insertable into second and third grooves respectively of the substrate, each member having a shape complementary to that of its respective groove.

18. The mechanism of claim 17, the second and third grooves terminating at the predetermined plane, surfaces of the second and third members which confront the predetermined plane having a recess formed therein which have a depth at least as large as a diameter of the fiber intermediate section, first and second parts of the fiber intermediate section being retained in the recesses and being urged into the predetermined plane subsequent to inserting the first and second members are inserted into the second and third grooves.

* * * * *